United States Patent
Sawhney et al.

(10) Patent No.: US 10,704,000 B2
(45) Date of Patent: *Jul. 7, 2020

(54) POLYMERIC DISPERSANTS FOR PETROLEUM PROCESS STREAMS

(71) Applicant: ECOLAB USA INC., St. Paul, MN (US)

(72) Inventors: Kailash Sawhney, Sugar Land, TX (US); Abuzar Syed, Richmond, TX (US)

(73) Assignee: Ecolab USA Inc., St. Paul, MN (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/833,181

(22) Filed: Dec. 6, 2017

(65) Prior Publication Data

US 2018/0155644 A1 Jun. 7, 2018

Related U.S. Application Data

(60) Provisional application No. 62/431,074, filed on Dec. 7, 2016.

(51) Int. Cl.

| | |
|---|---|
| *C10G 75/04* | (2006.01) |
| *C08F 8/32* | (2006.01) |
| *C08F 2/00* | (2006.01) |
| *C08F 8/12* | (2006.01) |
| *C08F 222/06* | (2006.01) |
| *C08F 210/14* | (2006.01) |
| *B05D 5/08* | (2006.01) |

(52) U.S. Cl.
CPC .............. *C10G 75/04* (2013.01); *B05D 5/08* (2013.01); *C08F 2/005* (2013.01); *C08F 8/12* (2013.01); *C08F 8/32* (2013.01); *C08F 210/14* (2013.01); *C08F 222/06* (2013.01); *C08F 2810/30* (2013.01); *C10G 2300/206* (2013.01)

(58) Field of Classification Search
CPC . C10G 75/04; C10G 2300/206; C08F 210/14; C08F 222/06; C08F 2/005; C08F 8/32; C08F 8/12; C08F 2810/30; B05D 5/08
See application file for complete search history.

(56) References Cited

U.S. PATENT DOCUMENTS

| | | | |
|---|---|---|---|
| 3,413,104 A | 11/1968 | Mehmedbasich | |
| 4,090,946 A | 5/1978 | Nottes et al. | |
| 4,137,185 A | 1/1979 | Gardiner et al. | |
| 4,731,095 A * | 3/1988 | Garapon | C08F 8/32 44/346 |
| 4,929,778 A | 5/1990 | Roling | |
| 5,055,212 A | 10/1991 | Le | |
| 5,110,997 A | 5/1992 | Dickakian | |
| 5,214,224 A | 5/1993 | Comer et al. | |
| 5,266,186 A * | 11/1993 | Kaplan | C10G 9/16 208/47 |
| 5,824,829 A | 10/1998 | Maeda et al. | |
| 5,955,404 A * | 9/1999 | Horodysky | C10M 141/10 508/294 |
| 2003/0166811 A1* | 9/2003 | Peiffer | C10L 1/143 526/258 |
| 2004/0039125 A1 | 2/2004 | Breuer et al. | |
| 2005/0261440 A1 | 11/2005 | Dickakian et al. | |
| 2010/0175315 A1* | 7/2010 | McRobbie | C10L 1/143 44/603 |
| 2012/0264665 A1* | 10/2012 | Wu | C10M 129/95 508/277 |
| 2014/0275663 A1 | 9/2014 | Brons | |
| 2017/0190950 A1* | 7/2017 | Kundu | C09K 8/524 |

FOREIGN PATENT DOCUMENTS

| | | | | |
|---|---|---|---|---|
| EP | 0438849 A1 * | 7/1991 | | C07C 233/36 |
| WO | 0206428 A1 | 1/2002 | | |
| WO | 2014165532 A1 | 10/2014 | | |
| WO | 2016164445 A1 | 10/2016 | | |

OTHER PUBLICATIONS

International Search Report for International Application No. PCT/US2017/064847, dated Feb. 6, 2018, 6 pages.
International Search Report for International Application No. PCT/US2017/064850, dated Mar. 19, 2018, 6 pages.
Written Opinion for International Application No. PCT/US2017/064847, dated Feb. 6, 2018, 6 pages.
Written Opinion for International Application No. PCT/US2017/064850, dated Mar. 19, 2018, 9 pages.
James G. Speight, "The Chemistry and Technology of Petroleum", 2nd Edition, New York: Marcel Dekker, Inc., pp. 96-97 and 404-451 (1991).
Coleman et al., Reaction of Primary Aliphatic Amines with Maleic Anhydride, J. Org. Chem., vol. 24, (1959) pp. 135-136.

* cited by examiner

Primary Examiner — Pamela H Weiss
(74) Attorney, Agent, or Firm — Kagan Binder PLLC

(57) ABSTRACT

Disclosed herein are methods and compositions for reducing fouling by natural and synthetic foulants that tend to precipitate during petroleum collecting, processing, transporting, and storing. The method includes applying one or more antifouling polymers to a petroleum product to form a treated petroleum product, wherein fouling by the treated petroleum product is reduced and a stable dispersion is formed over a wide range of processing conditions. The one or more antifouling polymers include the polymerized residues of one or more α-olefins and maleic anhydride, further wherein the maleic anhydride residues are reacted with a primary amine. Concentrates of the antifouling polymers in solvents are stable and pourable at temperatures of 0° C. to −40° C.

15 Claims, No Drawings

POLYMERIC DISPERSANTS FOR PETROLEUM PROCESS STREAMS

TECHNICAL FIELD

The invention is directed to polymeric dispersants for petroleum products, and uses thereof.

BACKGROUND

Hydrocarbon processing plants, from refineries to petrochemical plants suffer from fouling as a result of deposition of hydrocarbon byproducts deposited in heat exchangers, furnaces, water recycling loops, distillation columns, vessels, lines, overheads and other processing equipment. These byproducts include a variety of hydrocarbons that may be present in crude oil as well as the byproducts of hydrocarbon refining processes. Fouling of the interior surfaces of processing equipment occurs over a time period that may vary from months to years depending on the unit being considered.

Asphaltene deposition is a common fouling mechanism observed in refinery heat exchanger networks. Asphaltenes are naturally occurring in crude oil, wherein oil and petroleum fractions in transportation, refinery separation and other processing operations often contain asphaltenes. Asphaltenes are generally defined as a solubility class of polydisperse, high molecular weight hydrocarbons that are insoluble in non-polar solvents. They are soluble in liquids having a surface tension above 25 dynes/cm, such as pyridine, carbon disulfide, carbon tetrachloride and benzene; and insoluble in nonpolar liquids having a lower surface tension, such as low-boiling petroleum naphtha, petroleum ether, liquified petroleum gases (e.g. methane, ethane, propane), pentane, isopentane, hexane and the like. Further information regarding asphaltenes can be found in Speight, *The Chemistry and Technology of Petroleum,* 2nd ed., New York: Marcel Dekker, Inc., pp. 96-97, and 404-451 which is hereby incorporated-by reference herein.

Asphaltene particles are believed to exist in the form of a colloidal dispersion stabilized by other components of crude oil. These naturally occurring dispersions can be destabilized by a variety of mechanical, thermal, and chemical conditions involved in oil production and processing. Blending of incompatible crude oils may also result in destabilization of asphaltenes. This destabilization may result in asphaltene aggregation, precipitation, and eventual deposition of a tarry residue on the processing equipment. Other high-molecular weight hydrocarbon foulants include heavy oil, tars, polynuclear aromatic hydrocarbons, and coke; polymers formed from polymerization of vinylic byproducts of petroleum processing such as styrene, butadiene, cyclopentadiene, and the like; aliphatic and aromatic hydrocarbons having a density less than that of water, commonly referred to as light oil; oxidized hydrocarbons; and thermal decomposition products resulting from the degradation of larger molecules, such as one of the foulants listed above, either alone or combined with one or more other compounds present in a petroleum mixture. All these foulants are of concern to the operators of hydrocarbon processing plants.

Asphaltenes and related foulants are an acknowledged issue in petroleum processing and are known to cause problems related to fouling in various types of equipment where these compounds contact interior surfaces thereof. Unless dissolved and/or effectively dispersed, asphaltenes and other foulants can accumulate and precipitate upon any one or more surfaces contacted within processing equipment or storage containers, causing fouling. Fouling causes a plethora of problems in a range of petroleum processing operations.

In one illustrative example of the foregoing problems, dilution steam systems employed in pyrolysis processes such as ethylene production processes often undergo fouling due to polynuclear aromatics (PNAs) and related foulants. If unchecked, these foulants can deposit on interior surfaces of the dilution steam system, lowering flow within the system or even plugging flow lines and paths; interfering with internal measurement equipment such as thermocouples etc. used to monitor the process flow; and lowering the efficiency in the processing pathway. Regular cleanings to remove foulants from interior surfaces of dilution steam systems is a major source of pyrolysis plant downtime.

Another illustrative example is fouling during hydrotreating. The hydrotreating is a catalyzed hydrogenation process that leads to the conversion of nitrogen and sulfur containing contaminants to hydrogen sulfide and ammonia. It is also used to convert aromatics and olefins into saturates. Processing of reactive hydrocarbon streams during hydrotreating leads to the formation of synthetic foulants under various conditions of thermal and oxidative polymerization of olefinic compounds. The foulants formed, or synthesized, during such processes adhere to the processing equipment surface, such as preheat exchangers, resulting in reduction of the unit throughput and pressure drop across heat exchanger tubes.

The foulants that accumulate and precipitate onto such petroleum processing surfaces as demonstrated above—as well as many other examples—are notoriously difficult to remove. Consequently, there is an ongoing need for new methods and compositions to effectively disperse asphaltene and related natural and synthetic foulants in petroleum processing systems in order to prevent interruptions for cleaning, protect downstream equipment, and increase the overall efficiency of petroleum processing.

Comer et al., U.S. Pat. No. 5,214,224 discloses olefin-maleic anhydride copolymers useful for antifouling of hydrocarbon streams. However, these anhydride functional polymers are reactive toward hydrolytic conditions, undergoing ring-opening addition of water to the anhydride functionalities. The hydrolyzed anhydride polymer does not have anti-fouling properties and being insoluble in hydrocarbon can potentially be a foulant itself. Thus, the anhydride-functional polymers are unsuitable for use in processing streams contaminated with water. Further, hydrolysis of anhydride functionalities may take place slowly over time even in a substantially dry petroleum product where water is an impurity of the petroleum product. Additionally, the olefin-maleic anhydride copolymers tend to either precipitate from petroleum products or form viscous, even solidified blends therewith at low temperatures, such as temperatures encountered in the field during winter petroleum processing operations.

There is a need to provide stable dispersions of natural and/or synthetic foulants in petroleum process streams during one or more petroleum processing operations. There is a further need to form stable dispersions of natural and/or synthetic foulants in petroleum products in high temperature environments existing during refining processes. There is a further need to provide concentrates of antifouling compositions that are stable dispersions and are pumpable or pourable to temperatures of about 0° C. to −40° C.

SUMMARY

Disclosed herein are compositions including a foulant and one or more antifouling polymers, the one or more antifouling polymers including, consisting essentially of, or consisting of the polymerized residues of one or more α-olefins and maleic anhydride, further wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties. The foulant is an asphaltene, another natural foulant, a synthetic foulant, or a combination of two or more thereof. In embodiments, the antifouling polymers are characterized by the substantial absence of anhydride moieties or imide moieties. In embodiments, the antifouling polymers are characterized by a substantial absence of anhydride and imide moieties. The antifouling polymers are dispersible in a liquid petroleum product or in a liquid petroleum process stream that includes a foulant, wherein the combination is a treated liquid petroleum product or a treated liquid petroleum process stream having the foulant dispersed therein. In embodiments, the treated liquid petroleum product or treated liquid petroleum process stream is a stable dispersion at temperatures of about 20° C. to 400° C.

Also disclosed herein is a concentrate comprising, consisting essentially of, or consisting of a combination of one or more antifouling polymers as described above and a solvent, wherein the antifouling polymer is present at about 15 wt % to 90 wt % in the solvent and the concentrate is pumpable or pourable at a temperature between about 0° C. to −40° C. In embodiments, the solvent has a dielectric constant of 15 or less. Further, the antifouling polymers are hydrolytically stable and thus are suitable to include in concentrates, petroleum products, and petroleum process streams contaminated with water, such as about 1 wt % water or less.

Also disclosed herein is treated petroleum product including, consisting essentially of, or consisting of a petroleum product and about 1 ppm to 1000 ppm of one or more antifouling polymers, the antifouling polymers including, consisting essentially of, or consisting of the polymerized residues of one or more α-olefins and maleic anhydride, further wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties. In embodiments, the treated petroleum product is a treated liquid petroleum product. The treated liquid petroleum products are stable dispersions between about 20° C. and 400° C., wherein the antifouling polymers are thermolytically stable and reduce or prevent fouling within the treated liquid petroleum products during one or more petroleum processing operations. Further, the antifouling polymers are not susceptible to hydrolysis, and therefore are suitable for use in and are stable in petroleum processing streams contaminated with water, such as about 1 wt % water or less.

In some embodiments, the treated petroleum products are treated petroleum process streams. The treated petroleum process streams cause 50% to 100% less fouling of petroleum process equipment over a first period of time, when compared to fouling of a petroleum process stream (that is, the untreated petroleum process stream) over the same period of time. In some embodiments, the treated petroleum products are stable dispersions, further wherein the dispersion stability is maintained during one or more petroleum processing operations, within one or more petroleum process streams, or during disposal of the composition within one or more petroleum process apparatus.

Also disclosed herein is a method of reducing fouling in one or more petroleum process streams, the method including, consisting essentially of, or consisting of applying about 1 ppm to 1000 ppm by weight or by volume of one or more antifouling polymers to a petroleum process stream to form a treated petroleum process stream, wherein the one or more antifouling polymers include, consist essentially of, or consist of the polymerized residues of one or more α-olefins and maleic anhydride, further wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties. In embodiments, the one or more antifouling polymers are added to the petroleum process stream prior to the disposition of the petroleum product in petroleum process equipment; in other embodiments, the one or more antifouling polymers are added directly to the petroleum process stream while the petroleum process stream is disposed within the petroleum process equipment: that is, the adding and the disposing are contemporaneous. In embodiments, the method includes subjecting the treated process stream to temperatures of about 20° C. to 400° C., wherein the treated process stream is a stable dispersion.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Additional advantages and novel features of the invention will be set forth in part in the description that follows, and in part will become apparent to those skilled in the art upon examination of the following, or may be learned through routine experimentation upon practice of the invention.

Definitions

As used herein, the term "fouling" means phase separation by precipitation from a petroleum product, further wherein the precipitant contacts and adheres to one or more interior surfaces of a petroleum process equipment. Recitations related to relative or quantitative fouling, antifouling, reduction in fouling, and like terms refer to results obtained by allowing a petroleum product to stand for 2 hours at about 20° C. (following any mixing with a non-solvent such as hexane or heptane, and/or heating etc. needed to obtain a test mixture) followed by volumetric determination of precipitate from the product. Such a result may be reported as a percentage change in fouling when treated and untreated petroleum products are compared in the same test.

As used herein, the term "foulant" means any one or more species that is present in a petroleum product and is capable of precipitation therefrom. Foulants include one or more natural foulants, one or more synthetic foulants, or combinations thereof as determined by context. In embodiments, one or more foulants are present as dispersed within a liquid petroleum product; in some such embodiments, the dispersion is a colloidal dispersion.

As used herein, the term "natural foulant" means any one or more foulant species inherently present in crude oil. In embodiments, natural foulants include asphaltene, heavy oil, tars, and aliphatic and aromatic hydrocarbons having a density less than that of water, commonly referred to as light oil. "Asphaltene" is a term of art employed in the petroleum industry and refers to a polydisperse, high molecular weight petroleum product that is insoluble in liquids having a surface tension below 25 dynes/cm. Asphaltenes may include one or more polycyclic moieties, one or more heteroatoms, one or more metals in trace amounts, and combinations of two or more of these.

As used herein, the term "synthetic foulant" means any one or more foulant species that are byproducts of petroleum refining processes. In various embodiments, synthetic foulants may include any one or more of: polynuclear aromatic hydrocarbons, coke, oxidized hydrocarbons, polymers formed from polymerization of vinylic byproducts of petroleum processing such as styrene, butadiene, cyclopentadiene, and the like; and thermal decomposition products resulting from the degradation of larger molecules, such as one of the above listed materials, and combinations of these.

As used herein, the term "petroleum product" and like terms means any hydrocarbon product obtained from a subterranean reservoir, any product derived therefrom, or any mixture thereof. Nonlimiting examples of petroleum products include but are not limited to crude oil, reduced crude oil, crude distillate, heavy oil, or bitumen, hydrotreated oil, refined oil, byproducts of petroleum product processing such as pyrolysis, hydrotreating, or phase separation, or mixtures of two or more of these.

As used herein, the term "liquid petroleum product" and like terms means a petroleum product that is substantially a liquid at 20° C.

As used herein, the term "petroleum process stream" and like terms means any petroleum product disposed within petroleum process equipment in fluid contact with an interior surface thereof, wherein the process stream includes a foulant. The process stream may be substantially static, such as a petroleum product disposed within in a settler (separator) or storage container. The process stream may be substantially dynamic, such as a liquid petroleum product disposed within a pipe during transportation of the product from a first location to a second location. In some embodiments the process stream includes one or more additional components related to petroleum processing; such components are not particularly limited.

As used herein, the term "petroleum process equipment", "petroleum process apparatus" and like terms means a manmade item having an interior surface including a metal, further wherein one or more petroleum products are fluidly contacted with the metal for any period of time and at any temperature. Petroleum process equipment includes items for removing petroleum products from a subterranean reservoir, for transporting one or more petroleum products from a first location to a second location, or for separating, refining, treating, isolating, distilling, reacting, metering, heating, cooling, or containing one or more petroleum products.

As used herein, the terms "pumping", "pumpable", "pouring", "pourable", or like terms refers, as determined by context, to "pour point" according to ASTM D-97A, or alternatively to a petroleum product having a sufficiently low viscosity to pump or pour using conventional oil collecting, refining, transporting, and storing equipment, or alternatively to the following summary of the test set forth in ASTM D-97A. The test indicated by ASTM D-97A includes the procedure of lowering the temperature of a composition by 3° C./minute, wherein the temperature at which no movement of the concentrate is observable is termed the pour point of the composition.

As used herein, the terms "dispersion", "emulsion", "dispersible", "dispersibility", "dispersed", "emulsified" and like terms refer to a material that is insoluble in a liquid medium but does not undergo gross phase separation from it. These terms may be used relatively, i.e. wherein dispersibility of a material is increased or decreased, as determined by context, to mean more of less of the indicated material is present as dispersed vs. separated; or wherein dispersion stability is increased or decreased, as determined by context. A dispersion or emulsion is unstable or stable in various embodiments as determined by context, further wherein "stable" and like terms means kinetically stable, thermodynamically stable, hydrolytically stable, shear stable, thermolytically stable, or a combination of two or more thereof, and "unstable" refers to an observation of one or more of phase separation and viscosification.

As used herein, the term "thermolytically stable" or like terms as applied to an antifouling polymer means that the polymer does not undergo substantial thermal degradation reactions when present in a petroleum process stream subjected to temperatures of about 20° C. to 400° C.

Unless specifically indicated otherwise, any carboxylate groups present within any polymer described herein are recited with reference to the free carboxylic acid (i.e. "acid groups" or the like), wherein the reference is further intended to encompass any conjugate base thereof (carboxylate), or a combination of both as residues within a single polymer.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe any range of values, for example "about 1 to 5" the recitation means "1 to 5" and "about 1 to about 5" and "1 to about 5" and "about 1 to 5" unless specifically limited by context.

As used herein, the terms "substantially" and "consisting essentially of" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, dispersibility, stability, rate, solubility, and the like; intended values include weight of a component added, concentration of components added, and the like. The effect on methods that are modified include the effects caused by variations in type or amount of materials used in a process, variability in machine settings, the effects of ambient conditions on a process, use of materials such as solvents or equipment such as mixing equipment wherein such use is solely to facilitate a recited process and/or a reaction, and similar uses and variations wherein the manner or degree of the effect does not negate one or more intended properties or results; and like considerations. Where modified by the term "substantially" or "consisting essentially of", the claims appended hereto include equivalents to these types and amounts of materials.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

It has been discovered that natural and/or synthetic foulants present in petroleum process streams can be dispersed using an antifouling polymer comprising, consisting essentially of, or consisting of the reaction product of a maleic anhydride-functional precursor polymer with a primary amine. The precursor polymer is copolymer of a C10-C36 α-olefin and maleic anhydride. In embodiments, the α-olefin has 10 to 36 carbons, or 14 to 32 carbons, or 18 to 30 carbons, or 24 to 28 carbons wherein the number of carbons is an average number, reflecting a blend of compounds, or a substantially single value, as determined by the user. The precursor polymer comprises a weight ratio of the α-olefin residues to maleic anhydride residues of about 1:1 to about 1:5. The weight average molecular weight ($M_w$) of the precursor polymer is from about 5000 g/mol to about 100,000 g/mol, when analyzed by gel permeation chromatography. The precursor polymer is synthesized using conventional techniques, e.g. radical addition polymerization principles and techniques familiar to those of skill in the art of polymer synthesis. The polymer is further analyzed using conventional methodology familiar to the polymer chemist, including gel permeation chromatography and infrared analysis, to ensure target structure and molecular weight are achieved in the precursor polymer. The synthesis of such precursor polymers is also described in Comer et al., U.S. Pat. No. 5,214,224.

The precursor polymer is then reacted with a linear or branched, C6-C30 primary amine or a mixture of such primary amines to form the corresponding antifouling polymer. The linear or branched primary amine has 6 to 30, or 8 to 30, or 10 to 30, or 12 to 30, or 14 to 28, or 16 to 24, or 16 to 20 carbons wherein the number of carbons is either an average number, reflecting a blend of compounds, or a substantially single value, as determined by the user. The reaction is accomplished by contacting the precursor polymer with the one or more primary amines at temperatures between about 20° C. and 100° C. In embodiments, the contacting is carried out using a molar ratio of amine moieties to anhydride moieties of about 1:2 to 2:1, or about 1:1 to 1:2, or about 2:3 to 3:2, or about 1:1 to 2:3, or about 1:1. In embodiments, the contacting is carried out in a solvent; in some such embodiments, the solvent is a petroleum solvent, that is, a liquid petroleum product or liquid mixture thereof intended for use as a solvent. Such petroleum solvents include e.g. paraffinic solvents, mineral oil, "HAN" or heavy aromatic naphtha, mixtures thereof, and the like.

In embodiments, the contacting does not result in the formation of imide moieties, and as a result in some embodiments the antifouling polymers are characterized by the substantial absence of imide moieties. Such contacting includes contacting at temperatures between about 20° C. and 100° C., for example about 30° C. to 90° C., or about 40° C. to 80° C., or about 50° C. to 70° C. The substantial absence of imide moieties is suitably determined, for example, by infrared analysis. In embodiments, the antifouling polymer is characterized by the substantial absence of anhydride moieties. In embodiments, the antifouling polymer includes 0 mol % to about 20 mol % of unreacted anhydride moieties, or 0 mol % to about 18 mol %, or 0 mol % to about 16 mol %, or 0 mol % to about 14 mol %, or 0 mol % to about 12 mol %, or 0 mol % to about 10 mol %, or 0 mol % to about 8 mol %, or 0 mol % to about 6 mol %, or 0 mol % to about 4 mol %, or 0 mol % to about 2 mol %, or 0 mol % to about 1 mol %, or 0 mol % to about 0.5 mol %, or 0 mol % to about 0.1 mol % of unreacted anhydride moieties when compared for example by infrared analysis to the precursor polymer.

We have found that these antifouling polymers are thermolytically stable under conditions commonly employed or encountered within petroleum process streams, thus may be suitably added to one or more petroleum processing streams prior to subjecting the processing stream to one or more thermolytically challenging processes, such as hydrotreating. We have found that these antifouling polymers as a class are thermolytically stable within petroleum process streams subjected to conventional conditions within petroleum process equipment. That is, the antifouling polymers retain their antifouling properties during petroleum processing at temperatures of about 20° C. to 400° C., or for example in petroleum process streams including hydrotreating process streams, wherein the treated petroleum product may reach temperatures of 400° C. Further, we have found that the antifouling polymers are hydrolytically stable—that is, not susceptible to hydrolysis—and therefore are suitable for use in petroleum processing streams contaminated with water, such as about 1 wt % or less of water.

In some embodiments, provided herein is an antifouling concentrate including, consisting essentially of, or consisting of one or more antifouling polymers and one or more solvents. The antifouling polymers are soluble in nonpolar solvents, that is, solvents having a dielectric constant of about 15 or less, and easily form antifouling concentrates having about 15 wt % to 90 wt % antifouling polymer in a nonpolar solvent. In embodiments, the one or more antifouling polymers are added to a solvent to form a concentrate, followed by addition of the concentrate to one or more petroleum process streams to form one or more treated petroleum process streams. The solvent employed to form a concentrate may be a petroleum solvent, that is, a liquid petroleum product or liquid mixture thereof intended for use as a solvent. Such petroleum solvents include e.g. paraffinic solvents, mineral oil, "HAN" or heavy aromatic naphtha, mixtures thereof, and the like. Such solvents include those having a dielectric constant of about 15 or less.

In embodiments, the antifouling concentrate includes about 15 wt % to 90 wt % of the one or more antifouling polymers, or about 15 wt % to 85 wt %, or about 15 wt % to 80 wt %, or about 15 wt % to 75 wt %, or about 15 wt % to 70 wt %, or about 15 wt % to 65 wt %, or about 15 wt % to 60 wt %, or about 15 wt % to 55 wt %, or about 15 wt % to 50 wt %, or about 15 wt % to 45 wt %, or about 15 wt % to 40 wt %, or about 15 wt % to 35 wt %, or about 15 wt % to 30 wt %, or about 15 wt % to 25 wt %, or about 20 wt % to 80 wt %, or about 30 wt % to 50 wt %, or about 50 wt % to 90 wt %, or about 50 wt % to 80 wt %, or about 30 wt % to 70 wt %, or about 40 wt % to 70 wt %.

The antifouling concentrates are stable at temperatures of about 60° C. to −40° C., wherein the concentrates are pumpable or pourable over the range and further do not form observable precipitate therein. The lower end of this range reflects the advantageous and stable nature of the antifouling concentrates. Thus, the antifouling concentrates are characterized as pumpable or pourable at temperatures of about 0° C. to as low as −40° C., as measured by ASTM D-97, or about 0° C. to −40° C., or about −10° C. to −40° C., or about −15° C. to −40° C., or about −20° C. to −40° C., or about −20° C. to −30° C. as determined by ASTM D-97, which includes the procedure of lowering the temperature of a composition by 3° C./minute and recording the temperature at which no movement of the concentrate is observable as the pour point of the composition.

In some embodiments, provided herein is a treated petroleum product which is a petroleum product including about 1 ppm to 1000 ppm by weight or by volume of one or more of the antifouling polymers as described above. Also provided herein is a treated petroleum process stream, which is a petroleum process stream including a treated petroleum product. Treated petroleum products are at least one of kinetically stable, thermodynamically stable, hydrolytically stable, shear stable, thermolytically stable, or a combination of two or more thereof during one or more human actions that would otherwise cause instability to arise. Such human actions include, but are not limited to, removing one or more petroleum products from a subterranean reservoir, transporting one or more petroleum products from a first location to a second location, contacting one or more petroleum products with petroleum process equipment, and/or separating, refining, treating, isolating, distilling, reacting, metering, heating, cooling, and containing one or more petroleum products.

We have found that the antifouling polymers are effective to form stable dispersions of foulants when added to a petroleum process stream in an amount corresponding to about 1 ppm to 1000 ppm total antifouling polymer by weight or by volume to a petroleum process stream, or about 5 ppm to 500 ppm, or about 10 ppm to 100 ppm, or about 1 ppm to 100 ppm, or about 1 ppm to 90 ppm, or about 1 ppm to 80 ppm, or about 1 ppm to 70 ppm, or about 1 ppm to 60 ppm, or about 1 ppm to 50 ppm, or about 1 ppm to 40 ppm, or about 1 ppm to 30 ppm, or about 1 ppm to 20 ppm, or about 5 ppm to 50 ppm, or about 10 ppm to 30 ppm.

In embodiments, the treated petroleum products and treated petroleum process streams are thermolytically stable at temperatures of about 20° C. to 400° C., for example about 100° C. to 400° C., or about 100° C. to 350° C., or about 100° C. to 300° C., or about 100° C. to 250° C., or about 100° C. to 200° C., or about 100° C. to 150° C. In embodiments, the antifouling polymers form stable dispersions with foulants during petroleum processing operations in which the treated petroleum process stream is subjected to temperatures of about 20° C. to 400° C., for example about 100° C. to 400° C., or about 100° C. to 350° C., or about 100° C. to 300° C., or about 100° C. to 250° C., or about 100° C. to 200° C., or about 100° C. to 150° C.

In some embodiments, provided herein is a method of reducing fouling in one or more petroleum process streams, the method including, consisting essentially of, or consisting of applying about 1 ppm to 1000 ppm by weight or by volume of one or more antifouling polymers to a liquid petroleum product present in a petroleum process stream, wherein the one or more antifouling polymers include, consist essentially of, or consist of the polymerized residues of one or more α-olefins and maleic anhydride, further wherein 80 mol %-100 mol % of the maleic anhydride residues are reacted with a primary amine defined by the formula R—NH$_2$, wherein R is a linear or branched hydrocarbon moiety comprising 6 to 30 carbon atoms or a mixture of two or more such moieties. In embodiments, the antifouling polymers are characterized by the substantial absence of imide moieties. In embodiments, the antifouling polymers are characterized by a substantial absence of anhydride or imide moieties.

We have found that the one or more antifouling polymers retain antifouling properties during one or more petroleum processing operations. Accordingly, the methods disclosed herein include, in some embodiments, subjecting a treated petroleum process stream to a temperature of about 20° C. to 400° C. Such methods include, in one or more embodiments, hydrotreating. The treated petroleum process streams, which in embodiments are treated liquid petroleum products disposed in fluid contact with an interior surface of petroleum processing equipment, result in reduction or elimination of fouling of the contacted interior surface.

The one or more antifouling polymers or a dispersion thereof are applied to a petroleum process stream batchwise, continuously, or semi-continuously. In some embodiments, the application of the antifouling polymer or dispersion thereof is manual; in other embodiments, the application is automated. In embodiments, the amount of one or more antifouling polymers applied over a selected unit of time is varied with a variable composition of the associated petroleum process stream.

In embodiments, the petroleum product present in the one or more petroleum process streams is crude oil, reduced crude oil, crude distillate, heavy oil, bitumen, coker charge, hydrotreater influent, flashed crude, light cycle oil, or a diesel or naphtha refinery stream. In embodiments, the petroleum process equipment is any equipment conventionally associated with the collecting, processing, transportation, or storage of one or more of crude oil, reduced crude oil, crude distillate, heavy oil, bitumen, coker charge, hydrotreater influent, flashed crude, light cycle oil, or a diesel or naphtha refinery stream, including pipes and associated infrastructure used to fluidly connect process equipment items together to facilitate processing of a process stream disposed therein.

In embodiments, the treated process stream comprises a mixture of two of more polymers wherein a first polymer is an antifouling polymer or a mixture of two or more thereof as described above, and a second polymer includes, consists essentially of, or consists of an alkyl substituted phenol-formaldehyde liquid polymer, a hydrophilic-lipophilic vinylic polymer, or a mixture thereof. In some such embodiments, the alkyl substituted phenol-formaldehyde liquid polymer comprises nonyl phenol/formaldehyde or t-butyl phenol/-formaldehyde polymer. In embodiments, the hydrophilic-lipophilic vinylic polymer comprises a hydroxyethylmethacrylate/lauryl acrylate copolymer. In other embodiments, the treated process stream is characterized by the absence of the second polymer.

The antifouling polymers or dispersions thereof are advantageously added to a petroleum product or a petroleum process stream (whether or not from an antifouling concentrate) to target about 1 ppm to 1000 ppm, or about 5 ppm to 500 ppm based on the weight of the petroleum product or the petroleum process stream, as selected by the user. The amount differs depending on what type of petroleum process equipment is addressed. In embodiments, or about 10 ppm to 500 ppm, or about 20 ppm to 500 ppm, or about 30 ppm to 500 ppm, or about 40 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 5 ppm to 450 ppm, or about 5 ppm to 400 ppm, or about 5 ppm to 350 ppm, or about 5 ppm to 300 ppm, or about 5 ppm to 250 ppm, or about 5 ppm to 200 ppm, or about 5 ppm to 150 ppm, or about 5 ppm to 100 ppm, or about 10 ppm to 300 ppm, or about 10 ppm to 250 ppm, or about 50 ppm to 250 ppm, or about 50 ppm to 200 ppm, or about 100 ppm to 200 ppm, or about 10 ppm to 100 ppm, or about 1 ppm to 100 ppm, or about 1 ppm to 90 ppm, or about 1 ppm to 80 ppm, or about 1 ppm to 70 ppm, or about 1 ppm to 60 ppm, or about 1 ppm to 50 ppm, or about 1 ppm to 40 ppm, or about 1 ppm to 30 ppm, or about 1 ppm to 20 ppm, or about 5 ppm to 50 ppm, or about 10 ppm to 30 ppm of one or more antifouling polymer is added to the petroleum product or a petroleum process stream.

The treated process streams, which are treated liquid petroleum products disposed in fluid contact with an interior surface of petroleum processing equipment, result in reduction or elimination of fouling of the contacted interior surface. In embodiments, the treated process streams undergo 50% to 100% reduction in fouling compared to the corresponding process stream (that is, the untreated process stream), or about 60% to 100%, or about 70% to 100%, or about 80% to 100%, or about 90% to 100%, or about 95% to 100%, or about 97% to 100%, or about 98% to 100% reduction in measurable fouling of the interior surfaces of petroleum process equipment compared to the corresponding process stream. In embodiments, the percent reduction in fouling is determined by the following test. A selected volume of treated liquid petroleum product is added to hexane or heptane to form a 1% to 100% solution of the petroleum product, and the diluted product is allowed to stand for 2 hours at about 20° C.; precipitate that forms is then measured volumetrically and reported as a percentage of the precipitate observed in the control sample, which is the corresponding untreated petroleum product.

In embodiments, fouling is measured as a relative increase in retention of solids within the treated petroleum product compared to the retention of solids in untreated petroleum product over the same time period. In embodiments, fouling is measured as a relative decrease in the weight or volume of precipitate arising from a selected period of contact of a treated petroleum process stream in an associated petroleum process equipment item, relative to the same period of contact of the petroleum process equipment with the corresponding untreated petroleum process stream. Stated differently, a reduction in fouling is a relative decrease in the measured weight or volume of solids deposited on or precipitated from petroleum process equipment contacted with the treated petroleum process stream over a selected period of time, when compared to the weight or volume of solids deposited or precipitated from an untreated petroleum process stream over the same period of time.

EXPERIMENTAL

The following examples are intended to show experimental embodiments of the invention. The embodiments are not limiting to the scope of the claims appended hereto. It will be recognized that various modifications and changes may be made without following the experimental embodiments described herein, further without departing from the scope of the claims.

Example 1

A copolymer of C24-C28 α-olefin with maleic anhydride (CAS No. 68459-79-0) was obtained according to the procedures outlined in Comer et al., U.S. Pat. No. 5,214,224. Then 50 g of the polymer was dispersed in 100 g of HAN (heavy aromatic naphtha), and the dispersion was heated to 60-65° C. with constant stirring. Then 20 g oleyl amine (20 g) was slowly charged to the mixture over a period of 30 minutes. The temperature of the reaction mixture was observed to rise to about 80° C. The mixture was stirred for additional 2 hours while maintaining the temperature at 60-65° C. The reaction was monitored by infrared for the disappearance of the anhydride peaks (1780 and 1711 cm$^{-1}$) and appearance of the amide peak (1679 cm$^{-1}$). No peaks associated with imide groups were observed to form during the reaction.

When the reaction was determined to be complete, an additional 100 g HAN was added to the mixture, and the mixture was stirred for an additional 30 minutes. Then the mixture was allowed to cool to ambient temperature and filtered to remove trace amounts of insoluble material in the reaction vessel. The product was observed to be 26 wt % solids in HAN and was employed as "Example 1" below.

Example 2

Fouling of a petroleum product in the presence of the polymer of Example 1 was determined using the following test procedure. Precipitation as measured by this procedure is predictive of relative fouling behavior in petroleum process streams.

Equipment used in the experiment included 12.5 mL graduated, conical centrifuge tubes; a timer, and a lightbox and/or flashlight for ease of viewing precipitate present in darker petroleum liquids. In each test, a centrifuge tube was charged with a mixture of either Crude Oil A (obtained from the Tesoro Refinery in Anacortes, Wash.) or Crude Oil B (obtained from Total Refinery in Port Arthur, Tex.) having 15 ppm of the antifouling polymer of Example 1; the mixtures were formed by mixing the corresponding amount of the 26 wt % solids dispersion of Example 1 with the crude oil sample, then adding 10 mL of this mixture to a centrifuge tube. The contents of the tubes were allowed to stand for 2 hours at 20° C. After standing, the volume of sediment at the bottom of the tube was measured. Where needed, the lightbox or flashlight was used to backlight the tubes in order to more easily view the volume of precipitate therein.

The procedure was repeated with the following additives, wherein 15 ppm solids of the following Products A, B, or C were added to either Crude Oil A or Crude Oil B. Product A: polyalkenyl succinate, 20-25% in HAN; Product B: alkyl phenol/formaldehyde resin, 35-40% in HAN; Product C: alpha olefin/maleic anhydride copolymer, 15-20% in HAN.

Finally, the procedure was repeated with Crude Oil A and Crude Oil B alone. Table 1 below reports results of Example 2 as percentages based the observed volume of precipitate for either Crude Oil A or Crude Oil B alone as control.

TABLE 1

Percent precipitate, based on Crude Oil A or Crude Oil B as equal to 100% precipitate following the procedure of Example 2.

| Crude Oil | Additive, 15 ppm | % ppt observed |
|---|---|---|
| A | None | 100 |
| A | Product A | 32 |
| A | Product B | 100 |
| A | Product C | 83 |
| A | Example 1 | 8 |
| B | None | 100 |
| B | Product A | 2 |
| B | Product B | 100 |
| B | Product C | 40 |
| B | Example 1 | 2 |

It can be seen from Table 1 that Product B did not reduce precipitation of either Crude Oil A or Crude Oil B. The polymer of Example 1 performed as well as or better than Product A or Product C in reducing precipitation from the crude oil samples. Further, the polymer of Example 1 provides more consistent performance than Product A and Product C when the natural variability of petroleum products is taken into account. For example, Product A reduced precipitation by 98% in Crude Oil B, but only reduced precipitation by 68% in Crude Oil B, a 30% variation in performance. Product C reduced precipitation by 60% in Crude Oil B, but only reduced precipitation by 17% in Crude Oil A, a 43% variation in performance. In sharp contrast, the polymer of Example 1 reduced precipitation by 92% in Crude Oil A and 98% in Crude Oil B—a 6% variation in performance. This result was unexpected by one of skill, since variability in crude oil samples is understood to provide variability in fouling as well as the ability to prevent fouling. Herein we provide an antifouling polymer suitable to address fouling over a range of petroleum products and petroleum process streams, obviating the need for reformulation with different antifouling polymers for different products and/or process streams.

Example 3

The pour point of petroleum products was determined using ASTM D-97, HAN as solvent. The pour point of a 15 wt % solids dispersion of Product C (alpha olefin/maleic anhydride copolymer) was found to be −12° C. The pour point of a 15 wt % dispersion of the polymer of Example 1 in HAN was found to be −26° C. At −26° C., the dispersion of the polymer of Example 2 was further observed to be free of precipitate.

It can be understood from the foregoing that the polymer of Example 1 provides a concentrate having a pour point that is sufficiently low to provide pumpability and pourability of the product in the field, even under commonly encountered winter conditions. Additionally, the pumpable/pourable product including the polymer of Example 1 remains substantially a single phase when subjected to temperatures as low as −26° C.; that is, the dispersion is stable at this temperature.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A treated petroleum product composition comprising a petroleum product comprising a foulant; and
    one or more antifouling polymers, the one or more antifouling polymers comprising the polymerized residues of one or more α-olefins and maleic anhydride, wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties; further wherein no imide moieties are detected by infrared analysis of the one or more antifouling polymers.

2. The composition of claim 1, wherein the foulant comprises asphaltene.

3. The composition of claim 1 comprising about 1 ppm to 1000 ppm of the one or more antifouling polymers by weight based on the weight of the composition.

4. The composition of claim 1 wherein the antifouling polymers are further characterized by the substantial absence of anhydride moieties.

5. The composition of claim 1 wherein the composition is a stable dispersion between about 20° C. and 400° C.

6. The composition of claim 1 wherein the treated petroleum product is a treated petroleum process stream.

7. A concentrate composition comprising:
    a solvent; and
    about 15 wt % to 90 wt % of one or more antifouling polymers, the one or more antifouling polymers comprising the polymerized residues of one or more α-olefins and maleic anhydride, wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties; further wherein no imide moieties are detected by infrared analysis of the one or more antifouling polymers.

8. The concentrate composition of claim 7 wherein the solvent is heavy aromatic naphtha.

9. The concentrate composition of claim 7 wherein the concentrate is pourable or pumpable between about 0° C. and −40° C.

10. A method of reducing fouling in one or more petroleum process streams, the method comprising
    adding about 1 ppm to 1000 ppm by weight or by volume of one or more antifouling polymers to a petroleum product to form a treated petroleum product; and
    disposing the treated petroleum product within petroleum process equipment to form a treated petroleum process stream,
    wherein the one or more antifouling polymers comprise the polymerized residues of one or more α-olefins and maleic anhydride, further wherein 80 mol %-100 mol % of the maleic anhydride residues are reacted with a primary amine defined by the formula R—$NH_2$, wherein R is a linear or branched hydrocarbon moiety comprising 6 to 30 carbon atoms or a mixture of two or more such moieties; and wherein no imide moieties are detected by infrared analysis of the one or more antifouling polymers.

11. The method of claim 10 wherein the adding of the one or more antifouling polymers is carried out prior to the applying of the petroleum product to the petroleum process equipment.

12. The method of claim 10 wherein the adding and the disposing are contemporaneous.

13. The method of claim 10 wherein the treated petroleum process stream is present at temperatures of about 20° C. to 400° C.

14. The method of claim 10 wherein the method further comprises hydrotreating the treated petroleum process stream.

15. The method of claim 10 wherein the adding comprises pumping or pouring a concentrate comprising about 15 wt % to 90 wt % of one or more antifouling polymers and a solvent, further wherein the concentrate is present at a temperature between about 0° C. and −40° C.

\* \* \* \* \*